US009503854B1

United States Patent
Kulfan et al.

(10) Patent No.: US 9,503,854 B1
(45) Date of Patent: Nov. 22, 2016

(54) CRITERIA-ASSOCIATED MEDIA CONTENT

(71) Applicant: Amazon Technologies, Inc., Reno, NV (US)

(72) Inventors: Craig Vincent Kulfan, Bainbridge Island, WA (US); Christopher Charles Battey, Edmonds, WA (US); Brian Scott Cripe, Seattle, WA (US); Geoffrey Eric Endresen, Everett, WA (US); Bala Anirudh Kurakula, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/815,634

(22) Filed: Jul. 31, 2015

Related U.S. Application Data

(62) Division of application No. 13/886,764, filed on May 3, 2013, now Pat. No. 9,131,339.

(51) Int. Cl.
H04W 24/00 (2009.01)
H04W 4/02 (2009.01)
H04W 8/24 (2009.01)
H04L 29/08 (2006.01)

(52) U.S. Cl.
CPC ............ *H04W 4/023* (2013.01); *H04W 8/245* (2013.01); *H04L 67/18* (2013.01); *H04W 4/02* (2013.01)

(58) Field of Classification Search
CPC ...... H04L 67/18; H04W 64/00; H04W 4/02; H04W 8/245
USPC .................... 455/456.2, 456.6, 418; 709/204
See application file for complete search history.

(56) References Cited

U.S. PATENT DOCUMENTS

| | | | |
|---|---|---|---|
| 8,762,496 B1 | 6/2014 | Kiveris | |
| 8,818,169 B2 * | 8/2014 | Stewart | H04N 5/913 386/248 |
| 2005/0125673 A1 * | 6/2005 | Cheng | G06F 21/32 713/182 |
| 2008/0071761 A1 | 3/2008 | Singh et al. | |
| 2008/0155588 A1 | 6/2008 | Roberts et al. | |
| 2008/0222705 A1 * | 9/2008 | Goodmon | H04H 60/51 726/4 |
| 2012/0086549 A1 * | 4/2012 | Barnes, Jr. | G06Q 10/1053 340/5.61 |
| 2012/0089470 A1 | 4/2012 | Barnes, Jr. | |
| 2013/0096966 A1 | 4/2013 | Barnes, Jr. | |
| 2014/0122697 A1 | 5/2014 | Liu et al. | |

(Continued)

OTHER PUBLICATIONS

Final Office Action for U.S. Appl. No. 13/886,764, mailed on Feb. 5, 2015, Craig Vincent Kulfan, "Criteria-Associated Media Content", 15 pages.

(Continued)

*Primary Examiner* — Danh Le
(74) *Attorney, Agent, or Firm* — Lee & Hayes, PLLC

(57) ABSTRACT

A content item may be associated with criteria that are to be performed to unlock the content items. In response to a user action, a determination as to whether the user action satisfies the criteria may be made. In response to determining that a user satisfied the criteria, the content item may be unlocked with respect to that user, meaning that the content item may become available to that user, such as via a corresponding user device. If it is determined that the criteria is not satisfied, the content item will remain unavailable to the user. Either a service provider or a user may associate the criteria with the content item, which may include video content, audio content, textual content, or image content.

19 Claims, 7 Drawing Sheets

(56) References Cited

U.S. PATENT DOCUMENTS

2014/0229968 A1* 8/2014 Francisco ............ H04N 21/441
 725/16
2015/0172395 A1* 6/2015 Jackson .................. H04L 67/18
 709/204

OTHER PUBLICATIONS

Office Action for U.S. Appl. No. 13/886,764, mailed on Oct. 10, 2014, Craig Vincent Kulfan, "Criteria-Associated Media Content", 8 pages.

* cited by examiner

CRITERIA-ASSOCIATED MEDIA CONTENT

CROSS-REFERENCE TO RELATED APPLICATION

This application is a division of, and claims priority to, co-pending commonly-owned, U.S. patent application Ser. No. 13/886,764 filed May 3, 2013, and entitled "Criteria-Associated Media Content," which is herein incorporated by reference in its entirety.

BACKGROUND

While engaging in various activities, consumers may desire to concurrently consume digital content that is relevant to those activities. However, accessing such content may require continuous input and attention from the consumer. For instance, as a consumer is visiting a museum, the consumer may want to consume digital content (e.g., text, audio, video, etc.) that relates to a particular work or exhibit that is currently being experienced. Typically, the museum may provide a digital media player that stores media content relating to each work or exhibit. When the consumer is ready to access media content that relates to a particular work or exhibit, the consumer may have to physically select the media content that corresponds to that work or exhibit, such as by pressing a button, a code, or otherwise interacting with the device. As a result, while the visiting the museum, the consumer may need to repeatedly and continuously interact with the digital player in order to consume content that relates to the specific work or exhibit being experienced by the consumer. Such interaction may be distracting, time-consuming, and confusing, which may lead to an overall negative consumer experience.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
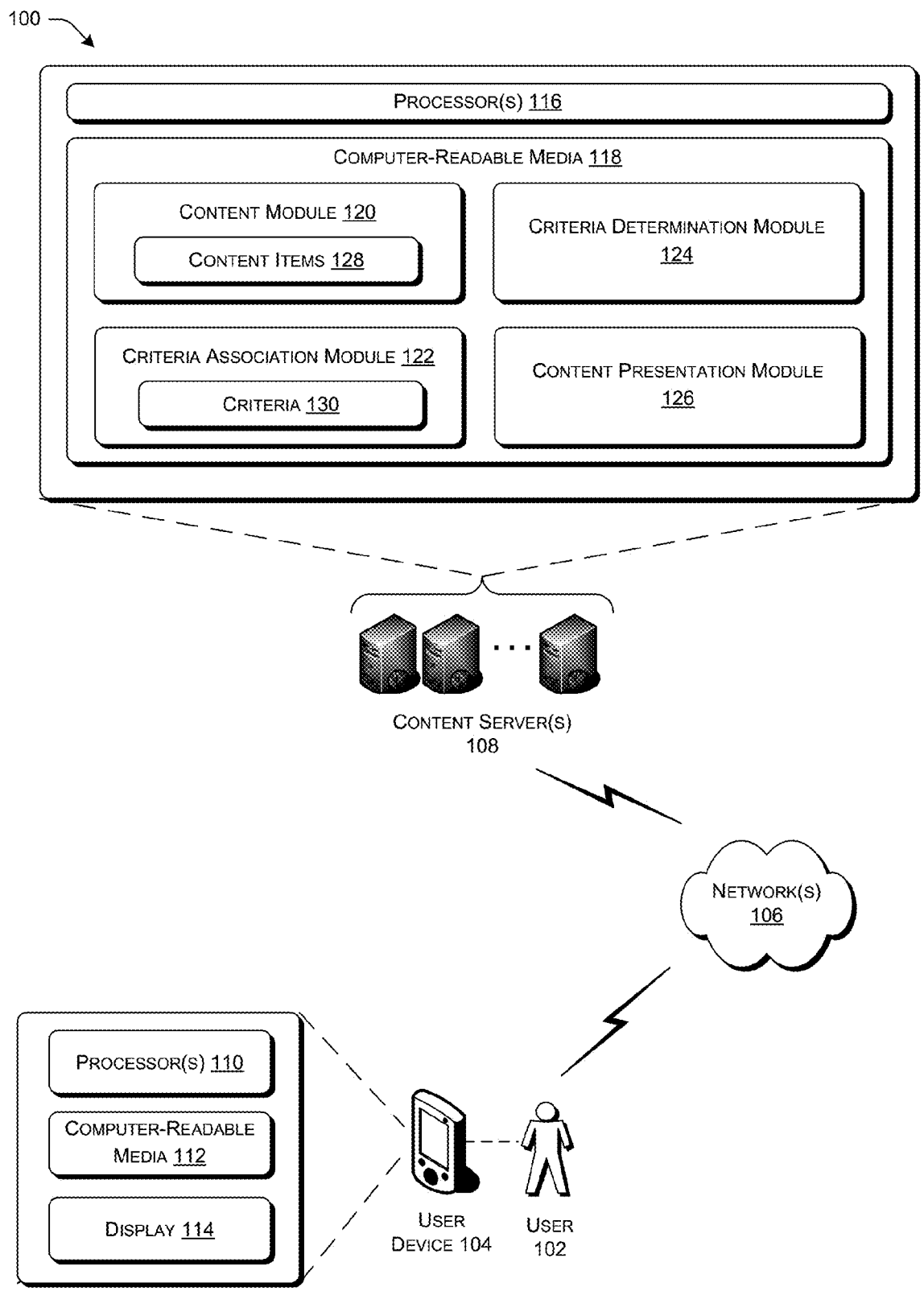
FIG. 1 is a diagram showing an example system for unlocking media content in response to determining that criteria associated with the media content has been satisfied.

This disclosure describes systems and processes for unlocking, or making available to consumers, media content that is associated with one or more criteria. More particularly, the systems and processes described herein may associate criteria with media content (e.g., audio content, video content, text, images, etc.). In various embodiments, the media content may be associated with a physical location, temporal criteria (e.g., time of day, day of the week, etc.), a particular action to be performed by a user, user authentication or validation, admission or subscription to a service or entity, and so on. Upon determining that a user has satisfied the criteria associated with a particular media content item, the systems and processes described herein may make that media content item available to the user, such as by unlocking the media content item or providing access to that media content item. Then, the user may access that media content via a corresponding user device (e.g., a mobile device).

For instance, a particular media content item (e.g., a video) may be associated with a specific physical location. Upon determining that a user is within a predetermined proximity from that physical location, the media content item may be unlocked and become available to that user. In some embodiments, the user may receive a prompt or alert indicating that the media content item is currently available. Once the media content item has been unlocked, the user may be authorized to access (e.g., play) the media content item. As illustrative examples, the media content items may relate to a game being played by the user or a scavenger hunt, or the media content items may serve as a guide that provides various information to the user.

In other embodiments, a user may associate criteria with media content, such as a particular media content item. Other users may then unlock or access the media content item after satisfying the criteria associated with the media content item. As a result, a first user may share media content with other users that are able to satisfy the associated criteria and, therefore, unlock the media content. For instance, a first user may associate a physical location, such as a tourist attraction) with a video or an image (e.g., a photo of the user in front of the Space Needle in Seattle, Wash.). Then, when a second user visits that physical location, the criteria associated with the video/image may be satisfied and the second user may be able to access that video/image. The second user may also have the opportunity to associate that physical location with other media content. As a result, that particular physical location (e.g., the Space Needle) may be associated with a compilation of media content (e.g., videos, images, comments, etc.) that relates to that physical location.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example system 100 for associating one more criteria with media content items that are unlocked or made available to consumers when it is determined that the one or more criteria has been satisfied. More particularly, media content items (e.g., video content, audio content, textual content, images, etc.) may be associated or tagged with various criteria that may be performed by a user. For example, the criteria may be associated with a physical location, an action to be performed by a user, a temporal criteria, user validation or authentication, etc. In response to the user satisfying the one or more criteria associated with a particular media content item, such as by the user being within a predetermined proximity of the physical location or the user authenticating or validating their identity, the media content item may be unlocked and made available to the user. The user may then access the media content item, such as consuming the media content item via a user device. As a result, media content may be limited or restricted to certain individuals, or to those individuals that perform a specific action that is associated with the media content.

As shown in FIG. 1, the system 100 may include one or more users 102, one or more user devices 104 associated with the users 102, one or more network(s) 106, and one or more content server(s) 108. In various embodiments, the user 102 may operate the user device 104, which may include one or more processor(s) 110, computer-readable media 112, and a display 114. The content server 108 may also include one or more processor(s) 116 and computer-readable media 118, which may include a content module 120, a criteria association module 122, a criteria determination module 124, and a content presentation module 126. The content module 120 may also maintain or be associated with one or more content items 128 and the criteria association module 122 may maintain or be associated with one or more criteria 130.

In various embodiments, the content server 108 may be a service provider, a service, a platform, or any number of servers or entities that associates the criteria 130 with the content items 128 (also referred to herein as "media content items" or "media content"). The content server 108 may also determine whether the criteria 130 associated with the content items 128 have been satisfied (e.g., by one of the users 102). Upon determining that the criteria 130 has been satisfied, the content server 108 may unlock the content items 128, make the content items 128 available to the user(s) 102 that satisfied the associated criteria 130, or provide the content items 128 to those users 102. The unlocked content items 128 may then be accessed by the users 102 that satisfied the criteria 130 that are associated therewith, and the unlocked content items 128 may be rendered by a corresponding user device 104.

In some embodiments, the user 102 (also referred to herein as "consumer" or "customer") may be any individual, group, or entity that may interact with the content items 128, the criteria 130, and/or the content server 108 via the network(s) 106. For instance, the user 102 may take any actions to satisfy the criteria 130 and unlock/access the content items 128. The user 102 may also operate the user device 104 to perform various functions associated with the user device 104, which may include the one or more processor(s) 110, the computer-readable media 112, and the display 114.

The user device 104 may be any type of device that is capable of performing actions with respect to satisfying the criteria 130 that is associated with the content items 128 or otherwise interacting with those content items 128, such as by associating criteria 130 with, unlocking, accessing, or rendering the content items 128. For instance, the user device 104 may include a personal computer, a laptop computer, a cellular telephone, a PDA, a tablet device, an electronic book (eBook) reader device, or any other device. The user device 104 shown in FIG. 1 is only one example of a user device 104 and is not intended to suggest any limitation as to the scope of use or functionality of any user device 104 utilized to perform the processes and/or procedures described herein.

The processor(s) 110 of the user device 104 may execute one or more modules and/or processes to cause the user device 104 to perform a variety of functions, as set forth above and explained in further detail in the following disclosure. In some embodiments, the processor(s) 110 may include a central processing unit (CPU), a graphics processing unit (GPU), both CPU and GPU, or other processing units or components known in the art. Additionally, each of the processor(s) 110 may possess its own local memory, which also may store program modules, program data, and/or one or more operating systems.

In at least one configuration, the computer-readable media 112 of the user device 104 may include any components that may be used to associate criteria 130 with content items 128, satisfy criteria 130 associated with media content, and/or access unlocked content items 128. Depending on the exact configuration and type of the user device 104, the computer-readable media 112 may also include volatile memory (such as RAM), non-volatile memory (such as ROM, flash memory, miniature hard drive, memory card, or the like), or some combination thereof.

In various embodiments, the user device 104 may also have input device(s) such as a keyboard, a mouse, a pen, a voice input device, a touch input device, etc. The user device 104 may also include the display 114 and other output device(s), such as speakers, a printer, etc. The user 102 may utilize the foregoing features to associate criteria 130 with content items 128, satisfy criteria 130 associated with the content items 128, and/or access unlocked content items 128. More particularly, the display 114 of the user device 104 may include any type of display 114 known in the art that is configured to present (e.g., display) information to the user 102, such as a screen or a touch-sensitive user interface.

In some embodiments, the network(s) 106 may be any type of network known in the art, such as the Internet. Moreover, the user device 104 and the content server 108 may communicatively couple to the network(s) 106 in any manner, such as by a wired or wireless connection. The network(s) 106 may also facilitate communication between the user device 104 and the content server 108. For instance, the content server 108 may provide unlocked content items 128 to the users 102 via the network(s) 106.

In addition, and as mentioned previously, the content server 108 may include the one or more processor(s) 116 and the computer-readable media 118. The content server 108 may also include additional components not listed above that may perform any function associated with the content server 108. In various embodiments, the content server 108 may be a service provider or any type of server, such as a network-accessible server, and may be one of multiple servers included in a server cluster or server farm. In other embodiments, the processor(s) 116 and the computer-readable media 118 of the content server 108 may be the same as, similar to, or different from the processor(s) 110 and the computer-readable media 112, respectively, of the user device 104.

The content module 120 may maintain or have access to any number of content items 128. For instance, the content module 120 may include or be communicatively coupled to a database or catalog that includes numerous content items 128. In various embodiments, the content items 128 may include any type of media content, such as audio content (e.g., a narrative, audio books, songs, a audio guide, etc.), video content (e.g., video narratives, movies, television programs, other videos, etc.), eBooks, still images (e.g., photographs), text, and any other type of content that may be accessible and renderable by the users 102.

The criteria association module 122 may associate criteria 130 with media content, such as the content items 128. The criteria 130 may relate to a physical location, user authentication/validation, an action to be performed by a user 102, temporal criteria, or any other type of criteria 130 that can be associated with the content items 128. Whether or not the criteria 130 have been satisfied may determine whether the content items 128 are unlocked, meaning that the content items 128 are then accessible and available to users 102. Examples of various criteria 130 and how the criteria 130 are associated with the content items 128 are explained in additional detail below.

The criteria determination module 124 may determine whether certain criteria 130 associated with content items 128 has been satisfied. If so, those content items 128 may be unlocked and made accessible/available to the user(s) 102 that satisfied the associated criteria 130. For example, the content items 128 may be provided to a user device 104 associated with the user 102 and/or the user 102 may receive a prompt or alert indicating that the content item(s) 128 are currently available. If it is determined that the criteria 130 has not been satisfied, the user(s) 102 may not have access to the content item(s) 128. In addition, the user(s) 102 may receive a message indicating that the content item(s) 128 are not available and that the user 102 has to satisfy certain criteria 130 in order to unlock the content item(s) 128.

Moreover, the content presentation module 126 may present or provide the unlocked content items 128 to the user(s) 102 that satisfied the criteria 130 associated therewith. For instance, upon a particular use 102 satisfying the criteria 130 associated with a content item 128, the content presentation module 126 may inform the user 102 that the content item 128 is now available or accessible. The user 102 may then access the content item 128, such as by playing or consuming the content item 128 using a corresponding user device 104.

Although FIG. 1 illustrates that the content server 108 may identify content 128 items to be associated with criteria 130, associate the criteria 130 with content items 128, determine whether the criteria 130 has been satisfied, and cause the content items 128 to become available to users 102, one or more of the foregoing operations may be performed by the user device 104. For instance, the user device 104 may associated criteria 130 with a content item 128, determine whether a particular user 102 has satisfied that criteria 130 and, if so, cause that content item 128 to become available to the user 102 that satisfied the criteria 130. As a result, systems and processes described herein may be performed on a device-to-device or a peer-to-peer level.

Example Content Server

Figure 2:
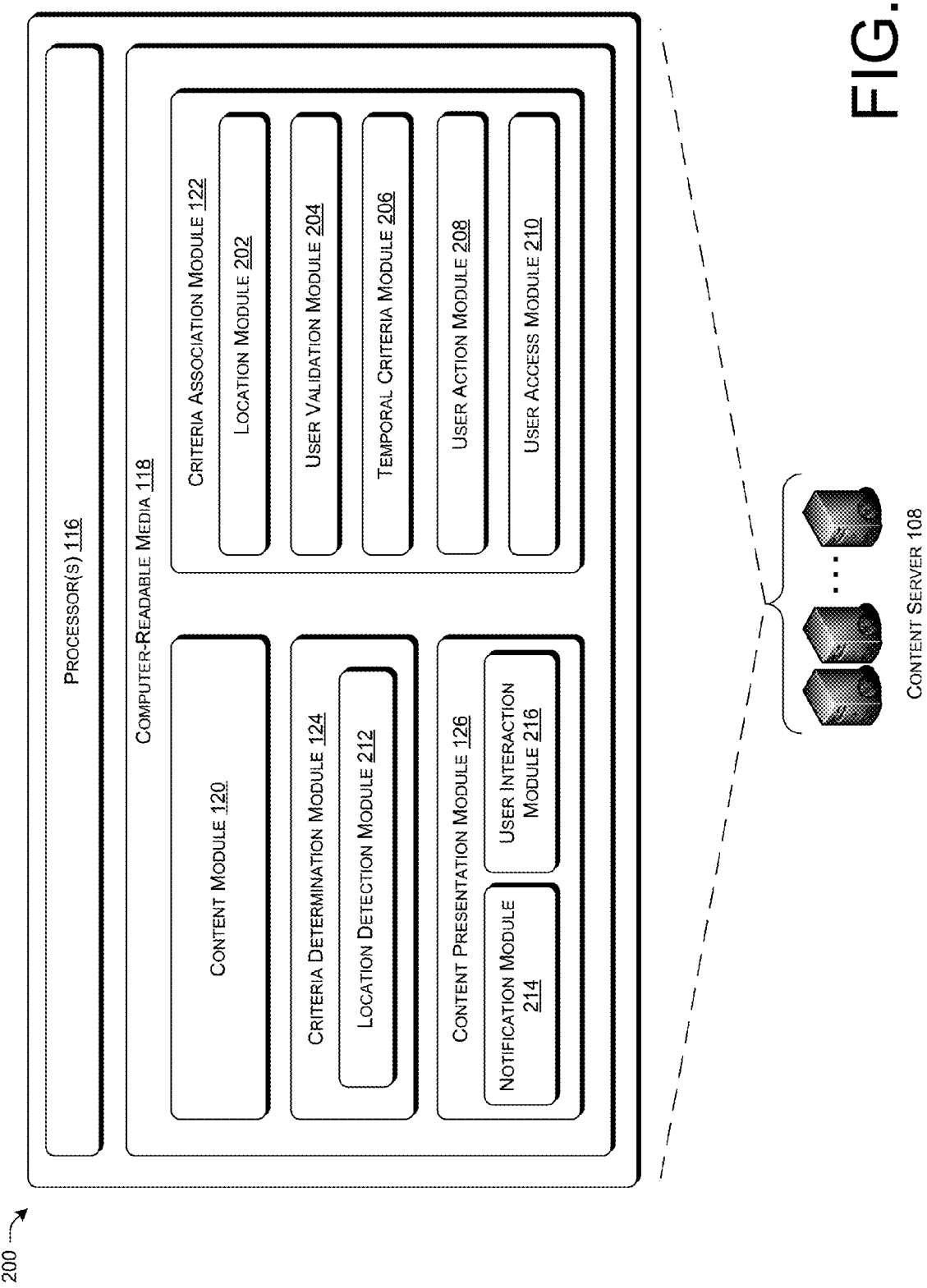
FIG. 2 is a diagram showing an example content server that is configured to associate criteria with media content and provide the media content to consumers after determining that the criteria has been satisfied.

FIG. 2 illustrates a diagram 200 illustrating an example content server, such as content server 108. As described with respect to FIG. 1, the content server 108 may include one or more processor(s) 116 and a computer-readable media 118, which may include a content module 120, a criteria association module 122, a criteria determination module 124, and a content presentation module 126.

In various embodiments, the content module 120 may identify content items 128 (e.g., media content) that may be associated with various criteria 130. The content items 128 may be stored in a database or catalog of content items 128 that are associated with the content module 120 or are accessible by the content module 120. As stated above with respect to FIG. 1, the content items 128 may include video content items, audio content items, text items, still images, eBooks, or other media content that can be rendered by a user device 104. For instance, the content items 128 may include videos, audio, images, text, eBooks, etc., that are associated with a particular criteria 130 (e.g., a physical location) and that may be unlocked when the criteria 130 is satisfied (e.g., a user 102 visits or is within a predetermined proximity from that physical location).

Moreover, the criteria association module 122 may associate or tag various criteria 130 with the content items 128. The criteria 130 may include any actions that are to be performed by a user 102 for the purpose of unlocking the content items 128. The unlocked content items 128 may then be accessible/available to those users 102 that actually satisfy the criteria 130. As shown in FIG. 2, the criteria association module 122 may include a location module 202, a user validation module 204, a temporal criteria module 206, a user action module 208, and a user access module 210. Each of the foregoing modules may be configured to associated different types of criteria 130 with the content items 128.

In particular, the location module 202 may associate a particular physical location, area, or region with one or more of the content items 128. More particularly, the content items 128 may be associated with a specific address, a cross street, global positioning system (GPS) coordinates, a physical location of an entity, merchant, landmark, tourist attraction, etc., a zip code, or any other region or area. Once identified, this physical location may be specifically associated with different content items 128, such as by associating a tag (e.g., a geotag) with the content items 128.

In some embodiments, a physical location (e.g., an address, GPS coordinates, etc.) may be embedded within a content item 128. As a result, in response to determining a current or previous physical location of a user 102 (e.g., via a user device 104 being utilized by the user 102), the content server 108 may determine whether the current location of the user 102 corresponds to the physical location associated with the content item 128. For instance, provided that GPS coordinates that correspond to a physical location have been embedded in a particular content item 128, the content server 108 may determine the physical location of a user 102 based on the GPS coordinates of a corresponding user device 104 (e.g., a mobile phone or PDA). Since the GPS coordinates associated with the content item 128 may be registered or maintained by a service or service provider (e.g., the content server 108), the content server 108 may determine whether the user's 102 physical location matches the physical location associated with the content item 128. If so, the content item 128 may be unlocked and become available to the user 102. However, if not, the user 102 may be informed that the content item 128 is not available at that time. Assuming that the user 102 desires to access that content item 128, the content server 108 may direct the user 102 to the physical location associated with the content item 128.

In other embodiments, radio-frequency identification (RFID) may be utilized by the content server 108. For the purposes of this discussion, RFID may correspond to the user 102 of a wireless non-contact system that uses radio-frequency electromagnetic fields to transfer data from a tag attached to an object, which may serve the purpose of automatic identification and/or tracking. RFID tags may contain electronically stored information that may be read from up to a predetermined distance. Here, the location module 202 may contain information that identifies various physical locations (e.g., tourist attractions, venues, landmarks, merchants, etc.). Moreover, a user 102 and/or a user device 104 associated therewith may include an RFID tag that enables the location module 202 to determine the current location of the user 102 and/or the user device 104. Based on the current location of a user 102, the location module 202 may make content items 128 that are associated with that physical location to be available to the user 102. Therefore, the user 102 may have access to videos, audio, text, etc., that are associated with and that are relevant to that physical location.

Furthermore, matrix barcodes (e.g., a two-dimensional bar code) may be utilized to determine the physical location of users 102. One type of matrix barcodes is a Quick Response Code® (QR Code®), which may consist of black modules (i.e., square dots) that are arranged in a square grid on a white background. For the purposes of this discussion, a QR Code® may be read by an imaging device, such as a camera incorporated in a user device 104, and then interpreted by the location module 202. Since data (e.g., location data), may be extracted from the patterns present in the horizontal and vertical components of the image, the location module 202 may determine a physical location that corresponds to the QR Code®. For instance, provided that a particular QR Code® corresponds to a physical location of a merchant, venue, landmark, tourist attraction, etc., in response to determining that a user 102 has captured or scanned the QR Code® using a user device 104, the location module 202 may determine the physical location of the user 102 based on the physical location that corresponds to the QR Code®. As a result, content items 128 associated with that physical location may be made available to that user 102.

In additional embodiments, near field communication (NFC) may be utilized to associate criteria 130 with media content and/or to determine the current location of users 102. NFC may correspond to a set of standards for mobile devices (e.g., telephones, PDAs, eBooks, laptop computers, etc.) and other devices to establish radio communication with each other by making physical contact or by bringing the two devices in close proximity of one another. NFC may also be performed between a mobile device and an NFC chip, which may be referred to herein as an NFC tag. In some embodiments, a user device 104 of a user 102 may be considered an NFC device and a different NFC device or NFC tag may be situated at a physical location (e.g., a merchant, venue, tourist attraction, landmark, address, etc.). When the user 102 places the user device 104 within a predetermined distance from the NFC device/tag, the location module 202 may determine that the user 102 is currently located at that physical location. As a result, media content that is associated with that physical location and that is relevant to that physical location may be provided to the user 102.

Accordingly, media content (e.g., video content, audio content, textual content, images, etc.) that is relevant to a particular physical location, such as a physical location that corresponds to a merchant, venue, landmark, tourist attraction, etc., may be made available to users 102 that are determined to be in close proximity to that physical location. Upon making such a determination, the media content may be unlocked, meaning that the media content may be accessible by those users 102 that satisfied, or helped satisfy, the criteria 130 (e.g., were within a predetermined distance to that physical location). The foregoing may provide a positive consumer experience for those users 102 that would like to automatically obtain additional information relating to an entity, venue, merchant, landmark, tourist attraction, etc.

For example, assume that a user 102 visits a location (e.g., a museum, historical landmark, national park, etc.) in which various information is available to the user 102. In the museum context, a user 102 would typically rent or buy a digital player that provides information relating to works or exhibits included within the museum. As the user 102 views these works/exhibits, the user 102 would need to press a button or perform some other action that corresponds to those works/exhibits. Here, in response to determining the current location of the user 102, the content server 108 may unlock content items 128 that are relevant to where the user 102 is currently located. For example, if it is determined that the user 102 is in close proximity to a particular exhibit, the content server 108 may unlock content items 128 (e.g., video content, audio content, textual content, etc.) that relate to that exhibit. That is, via a user device 104, the user 102 may have access to an audio or video file that describes the exhibit, provides historical information about the exhibit, and so on. The content server 108 may continue to provide relevant content items 128 to the user 102 based on the determined location of the user 102. As a result, content items 128 that are relevant to certain locations may become accessible to the user 102, which may provide for a more positive user experience.

Similarly, in response to determining that the user 102 is in close proximity to a certain landmark, the content server 108 may unlock media content that is relevant to that landmark. For example, if the user 102 is determined to be within a predetermined distance from the Space Needle, the content server 108 may unlock media content relating to the Space Needle, such as audio/video/textual content that provides information about its history, how it was built, etc. Moreover, the content items 128 that are made available to users 102 may only be accessible to those users 102 that have satisfied certain criteria 130 associated with the physical location, such as those users 102 that are determined to be within a predetermined distance from the location.

The systems and/or processes described herein may also provide content items 128 to users 102 based at least in part on the users' 102 proximity to physical locations associated with individuals, whether alive or deceased. For example, assume that a user 102 was walking down the "Hollywood Walk of Fame" (Hollywood, Calif.) that includes numerous brass stars that are embedded in the sidewalk. Each star is associated with an individual or group (e.g., actors, musicians, directors, musical groups, etc.) and serves as a public monument relating to the achievement of those individuals/groups in the entertainment industry. In these embodiments, the physical locations of one or more of the stars may be associated with different content items 128, where each content item 128 may include audio content, video content, etc., that provides information about the individual/group corresponding to the star. As a result, as a user 102 is walking down the Hollywood Walk of Fame and is determined to be in close proximity to one of the stars (e.g., utilizing GPS, RFID, etc.), the content item(s) 128 that are associated with, and relevant to, that star may be unlocked and made available to the user 102. As the user 102 continues to come in close proximity to other stars, the content items 128 associated with those stars may then be accessible to the user 102. Accordingly, the content items 128 provided to the user 102 may serve as a virtual tour of the Hollywood Walk of Fame, without the user 102 having to take any action besides accessing the content items 128.

An embodiment similar to the preceding example may take place in a cemetery that includes multiple gravesites. For example, content items 128 that are associated with the physical location of each gravesite may include media content (e.g., video content, audio content, etc.) that provides biographical information about the deceased individual that is associated with that gravesite. As a result, while a user 102 is walking cemetery, the content server 108 may determine the current location of the user 102. Then, the location module 202 may unlock content items 128 that relate to biographies of deceased individuals that are associated with gravesites that are in close proximity to the user's 102 current physical location. The user 102 may be prompted that such content items 128 are available, or the biographies of the deceased individuals may be presented via a user device 104 associated with the user 102.

In other embodiments, content items 128 may be associated with certain criteria 130 for the purpose of users 102 engaging in activities in which the users 102 attempt to find clues, media content, or other objects located at physical locations (i.e., a scavenger hunt). Provided that users 102 engaged in the activity are searching for clues to a next physical location, the clues may be in the form of the content items 128. That is, when the user 102 is determined to be in close proximity to a particular physical location that is associated with a content item 128, the content item 128 may be unlocked and made available to that user 102. The unlocked content item 128 may include audio content, video content, textual content, etc., that includes a clue that may help direct the user 102 to a different physical location. The next physical location may also be associated with a different content item 128 and the foregoing process may be repeated.

Moreover, the order in which physical locations are visited may have an effect on whether certain content items 128 are unlocked and which content items 128 are unlocked. For example, assume that a user 102 may visit multiple different physical locations—a first location and a second location. If the user 102 first visits the first location, the user 102 may receive access to a first content item 128. However, if the user 102 first visits the second location and then subsequently visits the first location, the user 102 may receive access to a second content item 128, which is different from the first content item 128. Accordingly, the user 102 may receive access to different content items 128 (e.g., the first content item 128 and the second content item 128) based on the order in which locations are visited. That is, the sequence or order in which physical locations are visited may impact which content items 128 are made available to users 102. In the museum context, if the content server 108 is aware that a user 102 was previously in close proximity to exhibit A (e.g., a Van Gogh painting), and is currently in close proximity to exhibit B (e.g., a Picasso painting), the content item 128 made available to the user 102 may provide information about both the exhibits (e.g., a comparison between the Van Gogh painting and the Picasso painting), instead of providing content items 128 that includes information about each exhibit individually.

Media content that is associated with a physical location may also be provided to users 102 in other circumstances. More particularly, the content items 128 that are relevant to a physical location in which the user 102 is situated may be provided to the user 102 regardless of where the user 102 is located. For instance, as the user 102 is moving between different physical locations (e.g., walking, driving, etc.), the content server 108 may monitor the current physical location of the user 102. Based on this determined location, the location module 202 may provide or present content items 128 that are relevant to, and associated with, those physical locations. For instance, as the user 102 is walking around a city, the user 102 may consume content items 128 that are unlocked based on the user's 102 current location. As a result, the unlocked content items 128 that are available to the user 102 may serve as a tour and provide relevant information about history, landmarks, merchants, tourist attractions, etc., associated with that city. Another example may include a "hop on, hop off" bus tour, in which relevant content items 128 (e.g., audio content, video content, etc.) may be presented to the user 102 as the user 102 comes in close proximity to a particular physical location associated with those content items 128. As a result, media content may be automatically presented to the user 102 without the user 102 having to listen to an automated guided tour or a tour guide.

Users 102 may also specify their interests/preferences and/or the type of content items 128 that they would like to unlock and receive. More particularly, a user 102 may indicate that he/she prefers to have access to historical information, sports-related content items 128, political information, etc. Then, as the user 102 travels between different physical locations, the content items 128 that are unlocked with respect to that user 102 may be both relevant to the specific location where the user 102 is currently located and relevant to the interests or preferences of the user 102. Accordingly, the content items 128 that are provided to users 102 may be customized, likely resulting in a more positive consumer experience.

In other embodiments, the location module 202 may associate physical locations with content items 128 that relate to video content (e.g., movies, television programs, etc.), where these physical locations may correspond to locations where various scenes took place. For instance, video content that corresponds to scenes of movies may be unlocked and made available to a user 102 when the user 102 comes in close proximity to the actual location where a movie scene was filmed or a location where the movie scene was intended to take place. That is, as the user 102 walks/drives around, movie scenes that relate to the physical locations that the user 102 visits may become unlocked and presented to the user 102. The user 102 may then have the opportunity to watch the movie scene while visiting the physical location associated with that movie scene. Therefore, the user 102 may receive a "movie tour" that highlights movie scenes in the locations in which those movie scenes were filmed.

The systems and/or processes described herein may also apply in the gaming context. In particular, the content items 128 that are associated with various criteria 130 may be provided to users 102 that are playing a virtual game. For instance, provided that the criteria 130 corresponds to physical locations that are associated with content items 128, as players of the game travel between different locations, media content associated with the game may be unlocked and presented to the players. That is, as a player comes within a predetermined distance of a particular physical location, one or more content items 128 may be unlocked and become available to the user 102 (e.g., superimposed on a user device 104). The content items 128 may correspond to instructions, potential moves, the player's progression through the game, the identity and/or progression of other players of the game, the previous, current, or anticipated future physical locations of players of the game, game features that are available to the player, and so on. Upon visiting that physical location and unlocking the content items 128, the player may interact with the game content (e.g., view a map, watch video content, listen to audio content, etc.) and proceed playing the game in some manner.

As a result, users 102 that are playing the game may travel to a particular physical location, thereby satisfying the criteria 130 associated with the content items 128 that are related to the game, and then have the ability to access media content that corresponds to game content, game instructions, new or updated game features, information about other players of the game, etc. In some embodiments, information about the players of the game may be accessible by the content server 108 and/or made public to other users 102 that are playing the game. As a result, the content server 108, or a service provider or administrator that is associated with the game, may identify users 102 that are playing the game and obtain information about those users 102 with respect to the game (e.g., how far they have progressed, an amount of currency or points obtained, etc.). Since player information may be published and made available to other players, each player of the game may determine their status or progression with respect to other players. Provided that users 102 traveled to different locations to satisfy the criteria 130 and unlock the content items 128, the users 102 may track the movement of other users 102 and be aware of game data associated with those users 102. Therefore, the content server 108 may track the past and current physical location of users 102 playing the game, and then possibly broadcast at least some game information to other players of the game.

In various embodiments, the content items 128 may be unlocked and made accessible to users 102 based on criteria 130 other than physical location. For instance, the user validation module 204 may cause content items 128 to be unlocked in response to a user 102 authenticating or validating his or her identity to the content server 108. That is, the criteria 130 associated with the content items 128 may correspond to user authentication and/or validation. In various embodiments, in order to authenticate or validate oneself, the user 102 may provide any type of information to the user validation module 204, such as information that may not be known to other users 102 (e.g., social security number, a user-specified password, etc.). In other embodiments, the user validation module 204 may utilize facial recognition techniques to identify/validate/authenticate the user 102. That is, a user device 104 may capture an image of the user 102 and the user validation module 204 may then determine whether the content item(s) 128 should be unlocked. In response to the user 102 providing information that uniquely identifies the user 102, the user validation module 204 may unlock and make available one or more content items 128 to the authenticated/validated user 102.

Alternatively, or in addition to the user 102 providing information about oneself, the user validation module 204 may attempt to verify that the user 102 is located (either previously or currently) at a particular physical location. In these embodiments, the content server 108 may be unable to determine the location of the user 102. As a result, the user validation module 204 may ask questions in which the answers may verify or confirm that the user 102 is at a particular physical location. For example, the user validation module 204 may ask the user 102 to identify a landmark, street names, a location of a particular merchant, and so on. Based on the user's 102 answers, the user validation module 204 may determine whether the user 102 is in fact located at that physical location. If so, the content item(s) 128 relevant to that location may be made available to that user 102.

The temporal criteria module 206 may associate temporal criteria 130 with the content items 128. That is, the content items 128 may be unlocked, and therefore be made available to users 102, based on any factor that relates to the time in which the users 102 attempt to access the content items 128 or the time in which the content items 128 are provided to the user device 104. With respect to the time in which the user 102 attempts to access the content item 128, the content item 128 may be stored on the user device 104 or the content item 128 may be stored on, or be accessible by, the content server 108. For instance, the availability of certain content items 128 may depend upon the time of day, the day of the week, etc. In addition, which media content 128 are selected may depend upon the time of day, the day of the week, etc. For example, during a tour, the content server 128 may make accessible a shorter content item 128, or shorter version of content items 128, if it is determined that the content items 128 will be accessed during a busy time (e.g., weekends, etc.) The criteria 130 associated with the content items 128 may also relate to the order in which physical locations are visited by a user 102 (e.g., certain content items 128 may have to be unlocked in a certain order), the number of times in which the content items 128 have been accessed (e.g., a limited number of users 102 may be eligible to unlock the content items 128), a manner in which the content items 128 have been accessed, environmental factors (e.g., weather conditions, etc.), and so on.

In other embodiments, the user action module 208 may associate criteria 130 with content items 128 that correspond to particular actions to be performed by users 102. For example, in order to unlock and gain access to content items 128, the user 102 may have to perform a specific action that is associated with those content items 128. Example actions may include capturing a photo or video, uploading a photo or video, uttering a voice command, identifying a landmark, merchant, tourist attraction, etc., answering a question, or doing ten jumping jacks. Accordingly, any action that is to be performed by a user 102 may represent criteria 130 that may be associated with a content item 128.

Moreover, the user access module 210 may restrict access to the content items 128 to particular users 102 or to users 102 that have been authorized to unlock the content items 128. For example, the user access module 210 may limit or restrict access of certain content items 128 to particular users 102, or to those users 102 that have performed certain actions. In some embodiments, access to certain content items 128 may be limited to users 102 that have obtained a subscription or have paid an admission (e.g., a user 102 paying admission to visit a museum). As a result, the criteria 130 associated with a content item 128 may be satisfied by a limited number of users 102.

In various embodiments, multiple different criteria 130 or a combination of criteria 130 may be associated with a single content item 128. For instance, in addition to a user 102 having to come within a predetermined distance from a physical location associated with a content item 128, the user 102 may also have to authenticate or validate himself/herself.

As will be described in additional detail below, in addition to the content server 108 associating criteria 130 with the content items 128, the users 102 may make such associations. For instance, a user 102 may associate media content (e.g., audio content, video content, etc.) with a physical location. The content server 108 may then allow the media content to be unlocked and accessed by other users 102 that satisfy the criteria 130 (e.g., visit that physical location). As a result, a particular physical location may have a collection of media items that relate to or are relevant to that location.

The criteria determination module 124 may determine whether users 102 have satisfied criteria 130 associated with content items 128. If it is determined that a user 102 has satisfied certain criteria 130, the content items 128 may be unlocked with respect to that user 102 and then made available to that user 102. On the other hand, if the criteria 130 have not been satisfied, the users 102 may not receive access to the content items 128. In some embodiments, the determination of whether the criteria 130 associated with a content item 128 has been satisfied may be based on user input or various sensors associated with a user device 104. For instance, a compass may determine the direction in which a user 102 is traveling, a motion sensor or accelerometer may determine motion of the user 102 and a rate of such motion, a camera may capture images or video that indicate a current location of the user 102, or a microphone may be used to capture voice commands, answers to questions, or other information that may allow the criteria determination module 124 to determine that certain criteria 130 have been satisfied.

In certain embodiments, the location detection module 212 may determine the current or previous locations of users 102 and then determine if those users 102 have satisfied the criteria 130 associated with the content items 128. In particular, based on GPS technology, an RFID, a QR Code®, an NFC device, any type of camera or capture device (e.g., a camera incorporated into a lens, glass, or any fully or partially transparent material), or any other type of technology, the location detection module 212 may determine a current or previous location of the user 102 or a corresponding user device 104. If the location detection module 212 determines that the user 102 is within a predetermined distance from the associated physical location, the content item 128 may be unlocked and provided to the user 102. Alternatively, the user 102 may receive an indication that the user 102 has to visit a particular location in order for the content item 128 to become accessible.

The content presentation module 126 may provide or make available content items 128 that have been unlocked by a particular user 102. For instance, in response to a user 102 satisfying criteria 130 associated with media content, the user 102 that caused the criteria 130 to be satisfied may receive access to the media content. In various embodiments, the notification module 214 may inform the user 102 that certain content items 128 have become unlocked, and are therefore available to the user 102. The notification module 214 may send alerts or prompts that inform the user 102 that the content items 128 are now available. For instance, as a user 102 comes in close proximity to a particular physical location, the notification module 214 may inform the user 102 that media content that is relevant to that physical location is currently available via their user device 104. Alternatively, the unlocked content items 128 may automatically be presented to the user 102, or may be provided to the user 102 a predetermined amount of time after the content items 128 become unlocked.

Furthermore, the user interaction module 216 may allow the users 102 to access or consume content items 128 that have been unlocked. For instance, the user 102 may view video content, listen to audio content, or view textual content or images, such as by utilizing a corresponding user device 104. In some embodiments, the content items 128 may be encrypted, restricted, or password-protected such that only those users 102 that satisfied the criteria 130 may have access to the content items 128.

Example User Device

Figure 3:
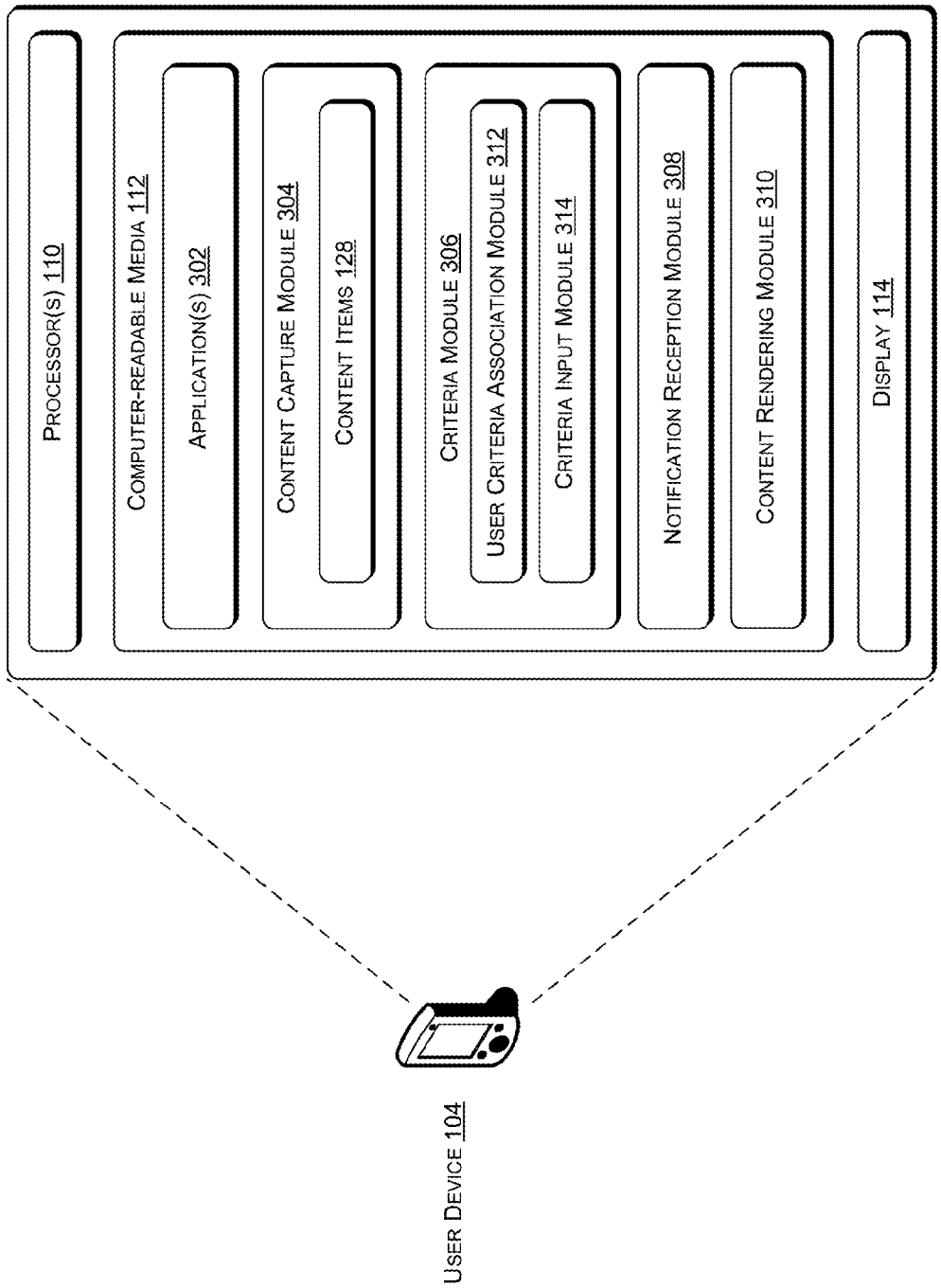
FIG. 3 is a diagram showing an example user device that is configured to associate criteria with media content and/or to receive unlocked media content that is associated with criteria.

FIG. 3 illustrates a diagram 300 illustrating an example user device, such as user device 104. As described above with respect to FIGS. 1 and 2, the user 102 may utilize the user device 104 to satisfy criteria 130 that is associated with content items 128 (e.g., audio content, video content, textual content, images, etc.), thus causing those content items 128 to be unlocked and become available to the user 102, and then render those content items 128 via the user device 104. Moreover, the content items 128 may be relevant to a physical location in which the user 102 is currently situated.

In addition, utilizing the user device 104, the user 102 may associate content items 128 with a physical location. For example, the user 102 may associate previously captured content items 128 (e.g., videos, images, audio files, etc.) or other content items 128 with criteria 130 (e.g., particular physical location). As a result, the associated content items 128 may be tied with that criteria 130 (e.g., that physical location) and may be available to those users 102 that are in close proximity to (e.g., within a predetermined distance of) that physical location. Moreover, other users 102 may also associated content items 128 with that physical location, thus allowing a single physical location (e.g., a landmark, a merchant, a tourist attraction, etc.) to have a compilation of different content items 128 (e.g., video content, audio content, images, textual content) relating to different users 102 be associated therewith. As users 102 visit that physical location, the users 102 may unlock and access content items 128 that are relevant to that physical location.

As shown in FIG. 3, the user device 104 may include the one or more processor(s) 110, the computer-readable media 112, and the display 114, which may the same as those described with respect to FIG. 1. Moreover, the computer-readable media 112 may include one or more applications 302, a content capture module 304, a criteria module 306, a notification reception module 308, and a content rendering module 310.

In various embodiments, the application(s) 302 may reside on the user device 104 and may enable the user 102 to interact with the content server 108 via the user device 104. More particularly, the application(s) 302 may allow the user 102 to satisfy criteria 130 associated with content items 128 (e.g., authenticate/validate oneself, upload media content, perform a user action, identify a current location, access a content item 128, etc.), unlock those content items 128, and then access and render the unlocked content items 128.

Moreover, the content capture module 304 may enable a user 102 to capture one or more content items 128, which may include video content, audio content, textual content, images, and so on. For instance, the content capture module 304 may be associated with a camera that may capture images and videos. The content capture module 304 may also be associated with a compass, motion sensor, and/or accelerometer that may determine movement, a rate of movement (e.g., velocity or acceleration), and/or an orientation of the user device 104. Furthermore, the content capture module 304 may be associated with one or more microphones that capture sound (e.g., a voice of the user 102, background noise, etc.) and a user input mechanism (e.g., a touch-sensitive display, buttons, etc.) that enables the user 102 to input text. The content items 128 or other user input captured or received by the user device 104 may be stored in the computer-readable media 112 of the user device 104.

The user criteria association module 312 of the criteria module 306 may enable the user 102 to associate one or more criteria 130 with the content items 128. More particularly, with respect to the content items 128 that are captured by, stored within, and/or accessible by the user device 104, the user criteria association module 312 may allow the user 102 to utilize the user device 104 to associate criteria 130 with those content items 128. Moreover, the user 102 may associate or tag media content with a particular physical location, where the contents or subject matter of the media content is particular relevant to that physical location. For instance, provided that the user 102 has captured, has stored, or has access to an image of the Space Needle, the user 102 may then associated that image with the Space Needle or a physical location where the Space Needle is situated. Other users 102 may also tag images, videos, audio, text (e.g., comments, recommendations, etc.) with the Space Needle. Therefore, a physical location, such as the Space Needle, may be associated with a compilation of media content from multiple different users 102, and may serve as a mash-up of media content that is accessible by users 102. That is, users 102 that visit the space needle may have access to the media content relating to the Space Needle.

The user criteria association module 312 may also allow users 102 to associate content items 128 with criteria 130 such that particular users 102 may access the content items 128 upon satisfying the criteria 130. For example, a user 102 may associate media content with a physical location, and then specify that certain users 102 (e.g., contacts, friends, family, etc.) may access the media content. As an example, a first user 102 may leave a content item 128 (e.g., a video, image, text, audio file, etc.) at a particular location by associating the location with that content item 128. In some embodiments, the content item 128 may be intended for a different user 102. Then, when a second user 102 (e.g., the intended recipient of the content item 128) arrives at that physical location, the content item 128 may automatically be presented to the second user 102. The second user 102 may also receive a prompt or message indicating that the content item 128 is available and/or that the content item 128 is from the first user 102. As a result, the content item 128 may be unlocked and consumed (e.g., watched, read, listened to, etc.) by the second user 102.

In some embodiments, the second user 102 may render this content item 128 utilizing the application(s) 302 associated with the user device 104. For instance, using the application 302, the first user 102 may view the scene associated with the physical location and associated content items 128 (e.g., comments, an image/video, etc.) relating to the physical location. Then, other users 102, such as the second user 102, may view the content items 128 utilizing the same or a similar application 302 associated with their own user device 104. As a result, users 102 may be able to view and render "virtual graffiti" that has been associated with that physical location.

The user criteria association module 312 may also allow users 102 to unlock and have access to content items 128 in places where various technologies are not typically available. For instance, assuming that a user 102 is hiking in an area that does not have sufficient cellular coverage, the user 102 may nonetheless receive prompts and/or otherwise gain access to media content that is relevant to the physical location in which the user 102 is hiking. As the user 102 is hiking, they may receive an alert indicating that a certain attraction (e.g., a good view, a landmark, a location where wildlife is commonly seen, etc.) is upcoming. In addition, the content items 128 made available to the user 102 may include information about trees/shrubs, flowers, wildlife, and historical information relating to that hiking location.

The content items 128 may be from the content server 108 or based on other users 102 associating that physical location with the content items 128. Moreover, the content items 128 may be made available to the user 102 in response to determining that the user 102 is currently located in a particular physical location.

In other embodiments, the criteria input module 314 may enable users 102 to provide input in order to satisfy criteria 130 associated with content items 128. For example, the users 102 may confirm that they are at a particular physical location, authenticate or validate themselves, perform a specific user action, and so on. Providing such input may cause the content items 128 associated with the criteria 130 to become unlocked with respect to those users 102 that satisfy the criteria 130.

In other embodiments, instead of unlocked content items 128 being automatically presented to the user 102, the notification reception module 308 of the user device 104 may receive notifications, alerts, prompts, or messages that indicate that certain content items 128 are unlocked with respect to the user 102 of the user device 104. Upon receiving such notifications, the user 102 may become aware that the content items 128 are accessible via the user device 104.

Upon the content items 128 becoming available to the user 102 of the user device 104, the content rendering module 310 may enable the user 102 to access or consume the content items 128. For instance, depending upon the type of content items 128 that are available, the user 102 may utilize the content rendering module 310 to view video content, images, and/or text (via the display 114) and/or listen to audio content (via one or more microphones of the user device 104).

As stated above with respect to FIG. 1, the operations performed by the content server 108 may be performed by the user device 104. That is, the user device 104 may select content items 128 that are to be associated with criteria 130, associate the criteria 130 with a particular content item 128, determine whether users 102 or other user devices 104 have satisfied the criteria 130, and/or cause that content item 128 to become available to users 102 that have satisfied the criteria, such as making that content item 128 available via a corresponding user device 104.

Unlocking of Content Items

Figure 4:
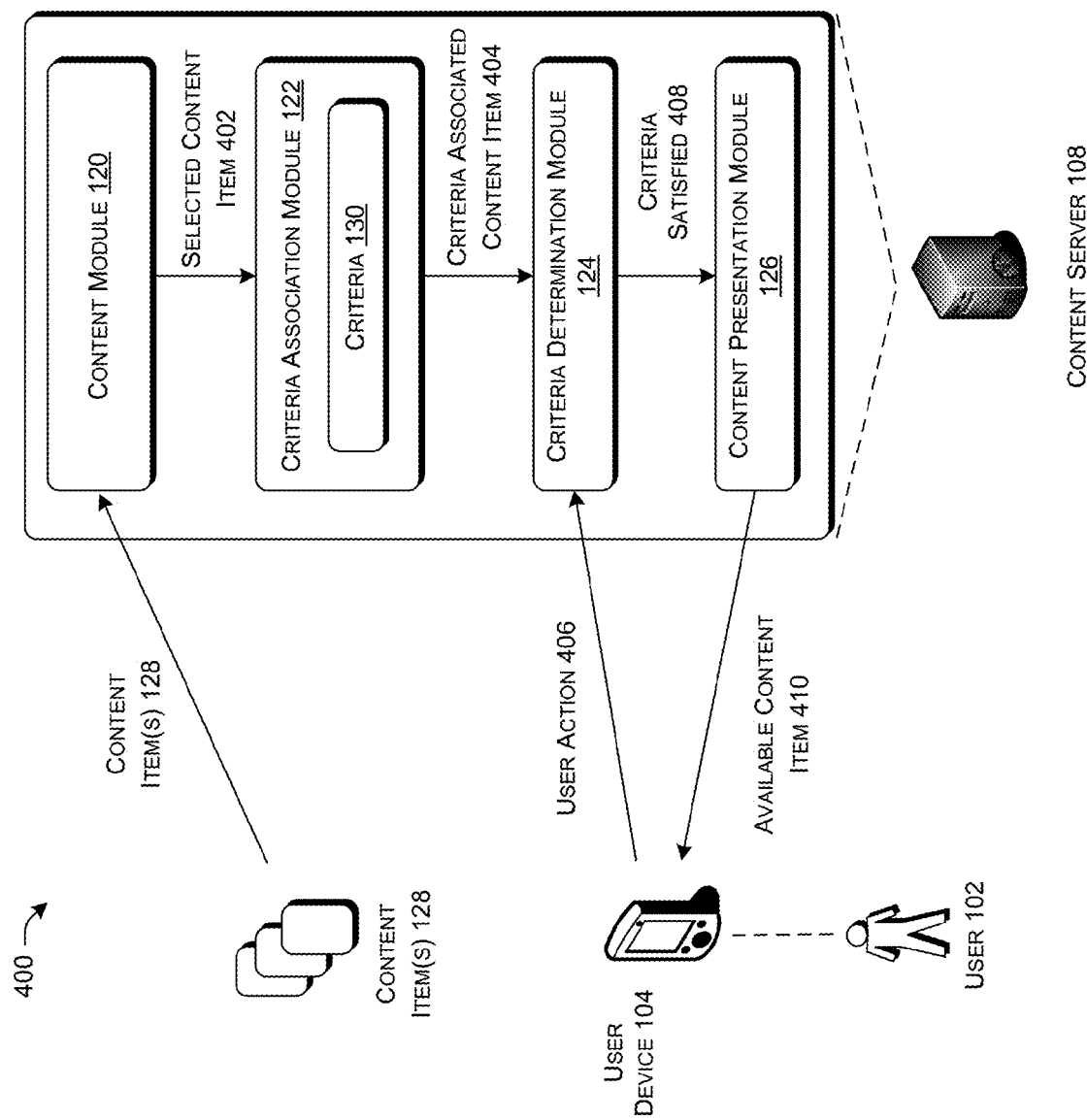
FIG. 4 is a diagram showing an example process for providing media content that is associated with criteria to consumers.

FIG. 4 illustrates a diagram 400 that illustrates an example process for presenting unlocked content items to a user. As shown in FIG. 4, the diagram 400 includes a user 102 and a corresponding user device 104 and the content server 108, which may include the content module 120, the criteria association module 122, the criteria determination module 124, and the content presentation module 126.

In various embodiments, the content module 120 may receive, maintain, or be associated with one or more content items 128, which may include video content, audio content, textual content, images, etc. Of these content items 128, the content module 120 may select at least one of the content items 128 (e.g., selected content item 402) to be associated with various criteria 130. The selected content item 402 may be provided to the criteria association module 122, which may associate one or more criteria 130 with the selected content item 402. As described above with respect to FIGS. 1-3, the criteria 130 may relate to a physical location, authentication or validation of a user 102, an action to be performed by the user 102, or any other information that may be associated with the selected content item 402.

The selected content item 402 having the criteria 130 associated therewith may be referred to as a criteria associated content item 404. The criteria determination module 124 may determine whether the criteria 130 associated with the criteria associated content item 404 has been satisfied by one or more users 102. More particularly, the criteria determination module 124 may analyze a user action 406 performed by the user 102 to determine whether the criteria 130 has been satisfied. In various embodiments, the user action 406 may include the user 102 being within a certain distance from a physical location, the user 102 validating or authenticating oneself, and so on. In some embodiments, the criteria determination module 124 may determine that the user action 406 satisfies the criteria 130 associated with the criteria associated content item 404 (e.g., criteria satisfied 408). As a result, the criteria associated content item 404 may be unlocked with respect to that user 102 and be made available to the user 102. The content presentation module 126 may then provide the available content item 410 to the user 102 via the user device 104. In some embodiments, the available content item may 410 be automatically presented to the user 102 or the content presentation module 126 may provide a notification indicating that the available content item 410 has become available.

In contrast, if the criteria determination module 124 determines that the user action 406 does not satisfy the criteria 130, the user 102 may receive a notification that the criteria associated content item 404 is not available. The user 102 may also receive information or instructions regarding actions that can be performed to satisfy the criteria 130 and, therefore, unlock the criteria associated content item 404.

Example Processes

Figure 5:
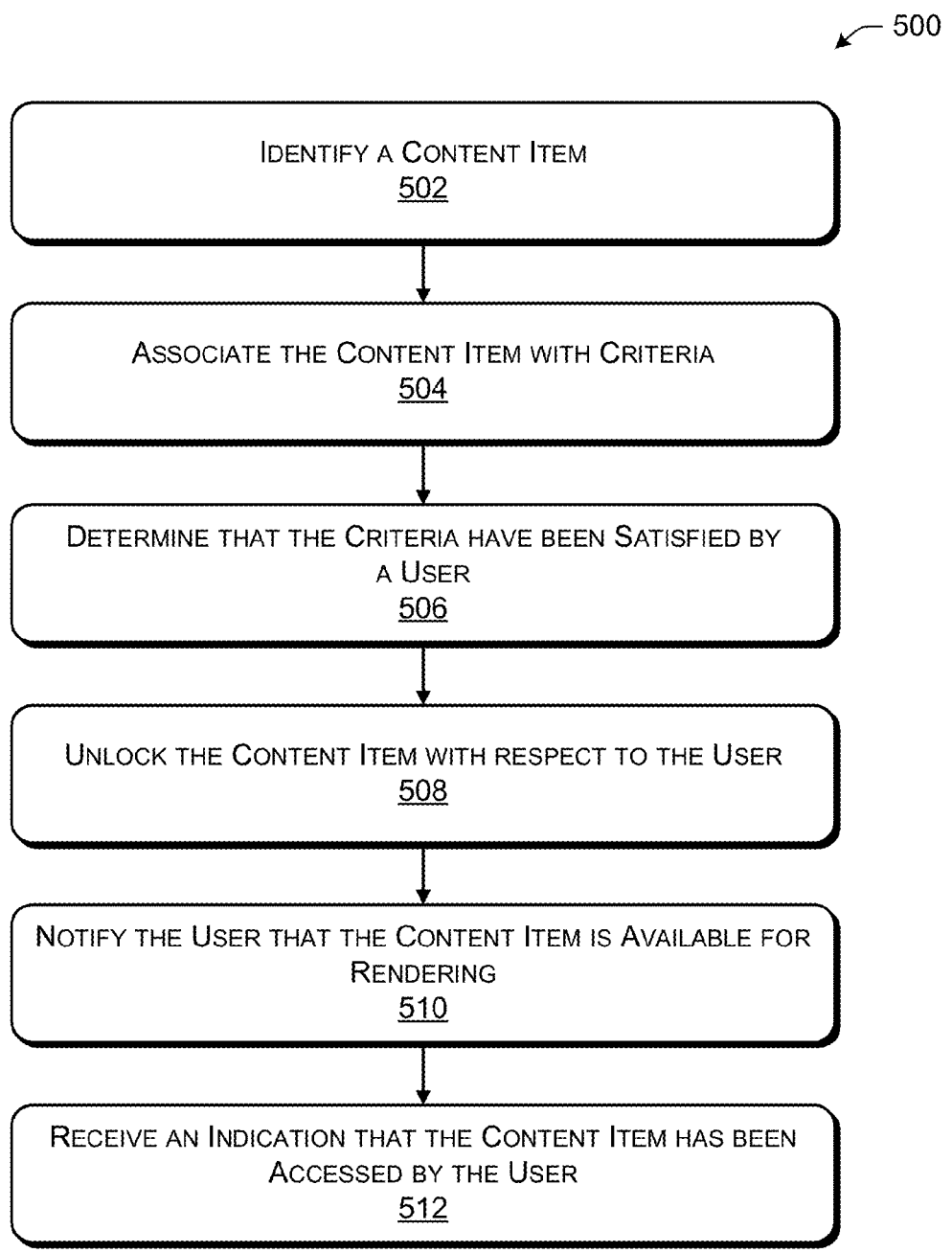
FIG. 5 is a flow diagram showing an example process for associating criteria with media content that is to be unlocked and made available to a consumer.
Figure 6:
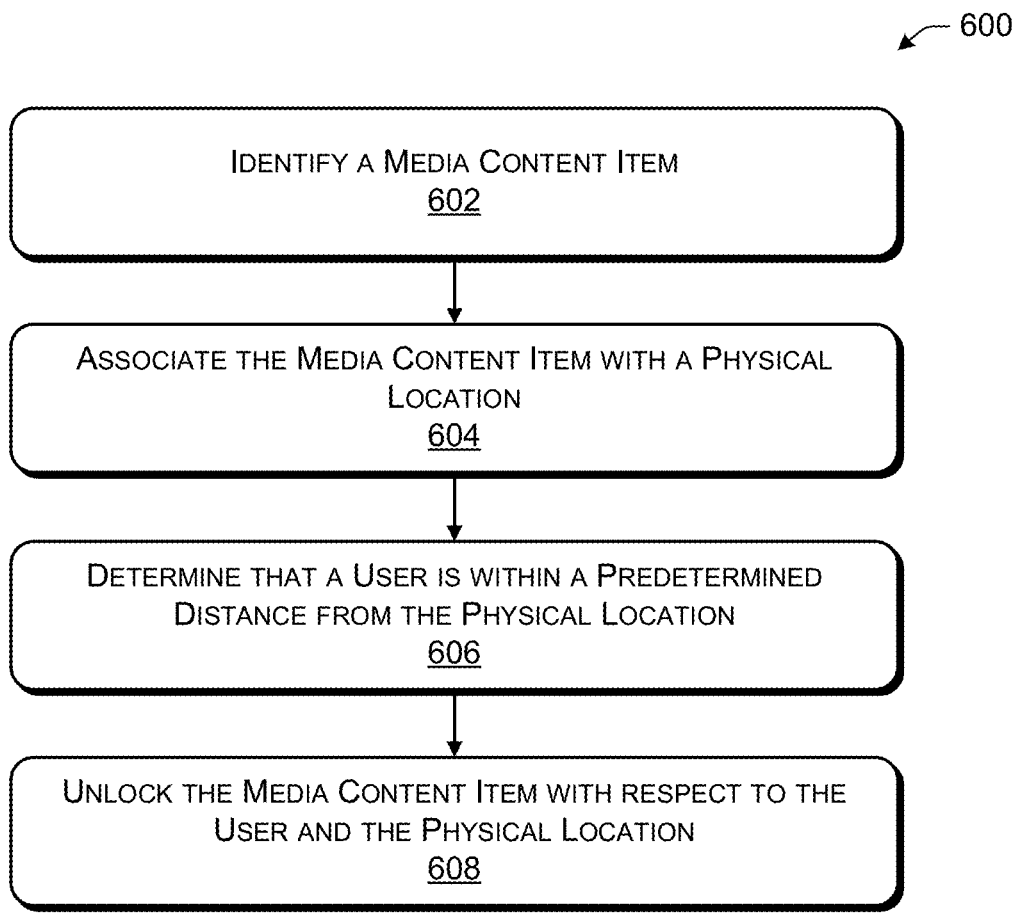
FIG. 6 is a flow diagram showing an example process for associating a physical location with media content that is to be unlocked and provided to a consumer.
Figure 7:
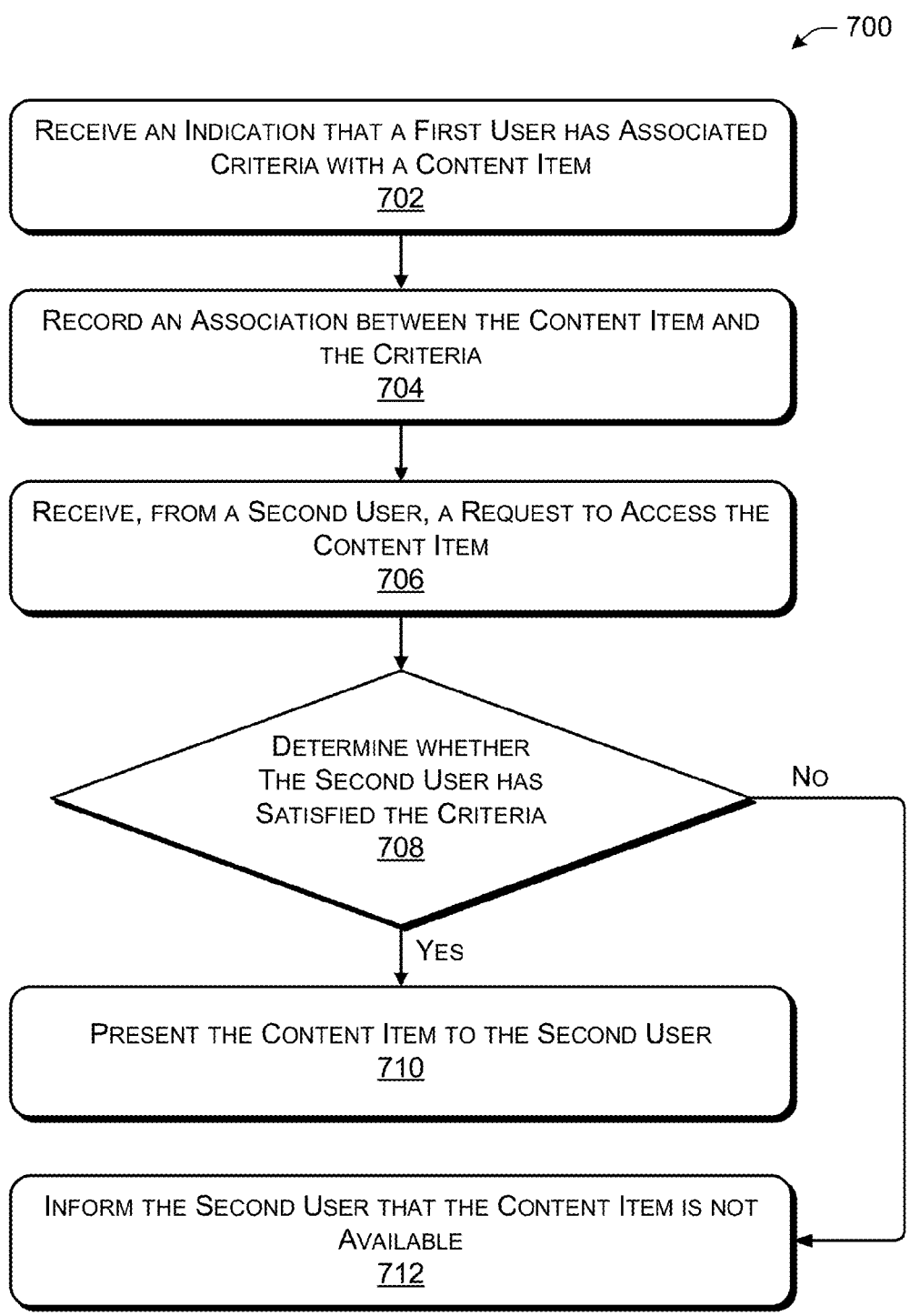
FIG. 7 is a flow diagram showing an example process for determining that criteria has been associated with media content and unlocking the media content after determining that the criteria has been satisfied.

FIGS. 5-7 describe example processes of unlocking content items based on criteria associated with the content items. The example process is described in the context of the environment of FIGS. 1-4 but is not limited to those environments. The process is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIG. 5 is a flow diagram illustrating an example process 500 of associating criteria with content items and unlocking the content items with respect to users that have satisfied the criteria. Moreover, the following actions described with respect to FIG. 5 may be performed by the content server 108, which may be a server or a service provider, as shown in FIGS. 1-4.

Block 502 illustrates identifying a content item. More particularly, the content server 108 may identify various types of media content, such as video content, audio content, textual content, image content, etc., that may be maintained, or accessible by, the content server 108.

Block 504 illustrates associating the content item with criteria. The content item 128 may be associated with a physical location, an action to be performed by a user 102, validation or authentication of a user 102, or any other information that is relevant to the content item 128.

Block 506 illustrates determining that the criteria have been satisfied by a user. Based at least in part on actions performed by the user 102 with respect to a corresponding user device 104, the content server 108 may determine that the criteria 130 have been satisfied. For example, provided that the criteria 130 is a physical location associated with the content item 128, the content server 108 may determine that the user 102 is currently within a predetermined distance from that physical location, which may cause the criteria 130 to be satisfied.

Block 508 illustrates unlocking the content item with respect to the user. Upon determining that the criteria 130 have been satisfied, the content server 108 may unlock the content item 128 for the user(s) 102 that have caused the criteria 130 to be satisfied. By unlocking the content item 128, that content item 128 may become available to, or accessible by, the user 102 via the corresponding user device 104. That is, unlocking the content item 128 may correspond to actually providing the content item 128 to the user 102 or otherwise causing that content item 128 to be available to the user 102.

Moreover, the content items 128 may be unlocked, or made available to the user 102, in any number of ways. For instance, the content server 108, or a user device 104, may provide the content item 128 directly to user devices 104. For instance, the content item 128 may be provided to the user 102 via an application residing on the user device 104. That is, when the criteria 130 associated with the content item 128 are satisfied, the content item 128, or at least a portion of the content item 128, may be automatically provided or displayed via the application. Alternatively, or in addition, the user 102 may receive via the application a notification indicating that the content item 128 is currently available, or will become available.

Moreover, provided that the content item 128 is stored on the user device, the content item 128 may be encrypted such that the user 102 may not be able to access the content item 128 in its encrypted form. The content item 128 may be unencrypted in response to determining that the criteria 130 associated with the content item 128 have been satisfied. For instance, the content server 108 may decrypt the encrypted content item 128 utilizing a key, or a key may be provided to the user 102 to allow the user 102 to access or render the content item 128. In addition, certain portions of the content item 128 may be associated with different criteria 130. Then, as a user 102 satisfies a certain criteria 130, only those portions of the content item 128 that are associated with those criteria 130 may become available to the user 102. The user 102 may then access other portions of the content item 128 when additional criteria 130 are satisfied.

Once the digital item 128 has been unlocked, the user 102 may have unlimited access to that digital content item 128. That is, that content item 128 may not be locked at a later time. In other embodiments, an unlocked content item 128 may be re-locked at a later time, thereby causing the user 102 to unlock additional criteria 130 in order to again access the content item 128. For instance, the content item 128 may be unlocked for a certain duration of time or when the user device 104 is located within a certain proximity from a physical location associated with the content item 128.

Various systems and processes for locking, unlocking, and/or making available content items are described in U.S. patent application Ser. No. 13/852,644, entitled "Location Based Detection," and filed on Mar. 28, 2013. The entire contents of this application are incorporated herein by reference.

Block 510 illustrates notifying the user that the content item is available for rendering. In some embodiments, the content server 108 may provide a notification, alert, prompt, and/or message that informs the user 102 that the content item 128 is available to be played, viewed, listened to, read, and so on, via the user device 104. The content server 108 may also automatically present the content item 128 to the user 102.

Block 512 illustrates receiving an indication that the content item has been accessed by the user. More particularly, the content server 108 may determine that the user 102 has actually accessed (e.g., rendered, consumed, etc.) the content item 128.

FIG. 6 is a flow diagram illustrating an example process 600 of associating a media content item with a physical location. Moreover, the following actions described with respect to FIG. 6 may be performed by the content server 108, which may be a server or a service provider, as shown in FIGS. 1-4.

Block 602 illustrates identifying a media content item. As stated above with respect to FIG. 5, the content server 108 may maintain or be associated with various types of media content.

Block 604 illustrates associating the media content item with a physical location. More particularly the content server 108 may associate a physical location that is relevant to the media content item with the media content item. For example, if the media content item is a video or image of the Space Needle, the physical location associated with the Space Needle may be associated with that media content item.

Block 606 illustrates determining that a user is within a predetermined distance from the physical location. Upon making the association described above, the content server 108 may determine whether the user 102 is in close proximity to the Space Needle. Moreover, since users 102 that are visiting the Space Needle may be particularly interested in the Space Needle, the content server 108 may make media content items that are relevant to the Space Needle available to those users 102. In this example, the media content items may include images of users 102 in front of the Space Needle, historical information relating to the Space Needle, information about the restaurant situated in the Space Needle, comments from users 102 that reference or describe the Space Needle, and so on.

Block 608 illustrates unlocking the media content with respect to the user and the physical location. In response to determining that the user 102 is within a predetermined distance from the Space Needle, the content server 108 may unlock the media content items associated with the Space Needle with respect to that user 102. As a result, the content server 108 may have determined that the user 102 satisfied the criteria 130 and, therefore, is to have access to the media content items. On the other hand, if the user 102 is determined to not be within the predetermined distance, the media content items may not be unlocked and the user 102 may not have access to the media content items. Optionally, the user 102 may receive a notification that indicates actions the user 102 may take to unlock media content items that are relevant to the Space Needle.

FIG. 7 is a flow diagram illustrating an example process 700 of unlocking content items that include user-associated criteria. Moreover, the following actions described with respect to FIG. 7 may be performed by the content server 108, which may be a server or a service provider, as shown in FIGS. 1-4.

Block 702 illustrates receiving an indication that a first user has associated criteria with a content item. More particularly, the content server 108 may receive an indication that a user 102 has associated criteria 130 (e.g., a physical location) with a content item 128 (e.g., a video, image, text, audio file, etc.). For instance, the user 102 may have associated a physical location with a photograph that shows the user 102 in front of a tourist attraction (e.g., the Space Needle). Moreover, the first user 102 may want to limit access to the content item 128 to particular users 102 (e.g., friends, family, social network contacts, etc.) or those users 102 that are able to satisfy the criteria 130.

Block 704 illustrates recording an association between the content item and the criteria. Upon receiving the indication, the content server 108 may specifically associate the criteria 130 with the content item 128. As a result, the content server 108 may identify criteria 130 that are to be satisfied before a content item 128 is to be unlocked and made available to a user 102.

Block 706 illustrates receiving, from a second user, a request to access the content item. Upon receiving a request to access, render, or consume the content item 128, the content server 108 may determine whether there are any criteria 130 associated with that content item 128.

Block 708 illustrates determining whether the second user has satisfied the criteria. In some embodiments, the content server 108 may determine whether the second user 102 has performed actions that cause the criteria 130 to be satisfied. For example, assuming that the content item 128 is an image of the Space Needle that is associated with its physical location, the content server 108 may determine whether the second user 102 is in close proximity to the physical location where the Space Needle is situated.

Block 710 illustrates presenting the content item to the second user. Following the "Yes" arrow, if the content server 108 determines that the second user 102 has satisfied the criteria 130 (e.g., the second user 102 is determined to be in close proximity to the Space Needle), the content server 108 may unlock the content item 128 with respect to the second user 102. As a result, the content item 128 may be made available to the second user 102 and be rendered via a user device 104 associated with the user 102.

Block 712 illustrates informing the second user that the content item is not available. Following the "No" arrow, if the content server 108 determines that the second user 102 has not satisfied the criteria 130 (e.g., the second user 102 is determined to not be in close proximity to the Space Needle), the content server 108 may not unlock the content item 128. Alternatively, the content server 108 may identify actions the second user 102 may take in order to unlock, and have access to, the content item 128.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving, from a first user device associated with a first user, an indication that a content item has been associated with a physical location;
   receiving, from a second user device associated with a second user, a request to access the content item;
   at least partly in response to receiving the request from the second user device, determining, via one or more computing devices, that the second user device is within a predetermined distance from the physical location; and
   at least partly in response to determining that the second user device is within the predetermined distance from the physical location, causing the content item to become available to the second user device.

2. The method as recited in claim 1, further comprising:
   receiving, from the first user device, a list of users that are authorized to access the content item;
   determining that the second user is included within the list of users; and
   at least partly in response to determining that the second user is included within the list of users, unlocking the content item for access by the second user device associated with the second user.

3. The method as recited in claim 1, wherein the content item includes at least one of video content, audio content, textual content, or image content that relates to the physical location.

4. The method as recited in claim 1, further comprising determining that the second user device is within a predetermined distance from the physical location based at least in part on global positioning system (GPS), radio-frequency identification (RFID), a matrix barcode, near field communication (NFC), or input provided by the second user device.

5. The method as recited in claim 1, wherein the physical location is associated with a plurality of content items that are each related to the physical location and that are associated with different users.

6. The method as recited in claim 1, wherein the content item is unlocked with respect to the second user device based at least in part on temporal criteria, an order in which the second user device visits multiple physical locations, an extent to which the content item has been accessed, or a subscription or an admission associated with the second user device.

7. A system comprising:
   one or more processors; and
   memory storing computer-executable instructions that, when executed, cause the one or more processors to perform acts comprising:
      receiving, from a first user device associated with a first user, a request to associate a content item with a physical location;
      associating access to the content item with the physical location;
      receiving, from a second user device, a request to access the content item;
      receiving, from the second user device, physical location information associated with the second user device;
      determining that the physical location information associated with the second user device locates the second user device within a predetermined distance from the physical location; and
      unlocking the content item for access by the second user device that is within the predetermined distance from the physical location.

8. The system as recited in claim 7, wherein the acts further comprise sending, in response to the physical location being within the predetermined distance, data associated with the content item to the second user device.

9. The system as recited in claim 7, wherein the physical location is expressed as location coordinates, and wherein the acts further comprise:
   calculating a distance between the physical location and a location of the second user device based at least in part on the location coordinates; and
   comparing the distance to the predetermined distance.

10. The system as recited in claim 7, wherein the content item is media content, and wherein the acts further comprise sending the media content to the second user device.

11. The system as recited in claim 7, wherein the acts further comprise sending a notification to the second user device that the content item is available for access by the second user device.

12. The system as recited in claim 7, wherein the acts further comprise determining that the content item has been accessed by the second user device.

13. The system as recited in claim 7, wherein the content item is unlocked with respect to the second user device based at least in part on an order in which the second user device visits multiple physical locations.

14. A method comprising:
   receiving, from a first user device associated with a first user, a request to associate a content item with a location used to create a physical location restriction;
   receiving, from a second user device, a request to access the content item;
   determining the physical location restriction associated with access to the content item;
   determining a physical location of the second user device;
   determining, via one or more computing devices, that the physical location of the second user device complies with the physical location restriction; and
   causing the content item to be accessible by the second user device that complies with the physical location restriction.

15. The method as recited in claim 14, further comprising:
   determining a temporal restriction associated with the content item; and
   wherein the causing the content item to be accessible is based at least in part on compliance with the temporal restriction.

16. The method as recited in claim 14, further comprising sending the content item to the second user device.

17. The method as recited in claim 14, further comprising sending a notification to the second user device that the content item is available for access.

18. The method as recited in claim 14, further comprising determining the physical location based at least in part on global positioning system (GPS) data or radio-frequency identification (RFID) data received from the user device.

19. A system comprising:
   one or more processors; and
   memory storing computer-executable instructions that, when executed, cause the one or more processors to perform acts comprising:

associating access to a content item with a physical location;

receiving, from a user device, a request to access the content item;

receiving, from the user device, physical location information associated with the user device, wherein the physical location is expressed as location coordinates;

determining that the physical location information associated with the user device locates the user device within a predetermined distance from the physical location;

calculating a distance between the physical location and a location of the user device based at least in part on the location coordinates;

comparing the distance to the predetermined distance; and unlocking the content item for access by the user device that is within the predetermined distance from the physical location.

\* \* \* \* \*